June 4, 1963 J. RECTOR 3,092,688

COMBINED TELEPHONE AMPLIFIER AND RADIO RECEIVER

Filed Sept. 21, 1960

4 Sheets-Sheet 1

INVENTOR.
JOSEPH RECTOR

BY

ATTORNEY

June 4, 1963 J. RECTOR 3,092,688
COMBINED TELEPHONE AMPLIFIER AND RADIO RECEIVER
Filed Sept. 21, 1960 4 Sheets-Sheet 2

INVENTOR.
JOSEPH RECTOR
BY Zoltan H. Polachek
ATTORNEY

June 4, 1963 J. RECTOR 3,092,688

COMBINED TELEPHONE AMPLIFIER AND RADIO RECEIVER

Filed Sept. 21, 1960

4 Sheets-Sheet 3

INVENTOR.
JOSEPH RECTOR

BY [signature]

ATTORNEY

COMBINED TELEPHONE AMPLIFIER AND RADIO RECEIVER

Filed Sept. 21, 1960

INVENTOR.
JOSEPH RECTOR
BY
[signature]
ATTORNEY

United States Patent Office 3,092,688

Patented June 4, 1963

3,092,688

COMBINED TELEPHONE AMPLIFIER AND RADIO RECEIVER

Joseph Rector, 225 W. 86th St., New York, N.Y.

Filed Sept. 21, 1960, Ser. No. 57,513

2 Claims. (Cl. 179—1)

This invention concerns a combined telephone amplifier and radio receiver.

According to the invention there is provided a cabinet housing a battery operated transistorized radio tuner and audio amplifier. The cabinet is provided with a switch operating, pivotable support for a conventional telephone transmitter-receiver handset. When the telephone handset is on the support, the audio amplifier is connected to a battery and is energized. Microphones are connected to the audio amplifier. The microphones are located to pick up sounds from the telephone receiver and to reproduce them in amplified form via a loud-speaker. Near the support for the handset on the front of the cabinet are two concavities or recesses. One concavity collects sounds produced by the telephone receiver and focuses them on one of the microphones. The other concavity collects the voice of a person speaking and directs it to the transmitter of the telephone. The cabinet contains a switch operated circuit which is actuated by placing the telephone handset on the support and by removing the handset from the support. Either microphone will collect sound from the telephone receiver and the other microphone directs sound signals to the telephone transmitter depending on the position of the handset on the support. When the telephone handset is removed the audio amplifier is deenergized. The pivotable support also actuates a switch which connects the signal output of the radio tuner to the audio amplifier when the telephone handset is removed from the support.

A door is provided for the cabinet which is hinged thereon and operates another switch when opened and closed. When the cover is opened, the radio tuner and audio amplifier are connected to and energized by the battery in the cabinet. When the cover is closed, the last-named switch opens. An antenna is mounted in the cover and is effective for receiving broadcast signals and applying them to the radio tuner.

It is therefore one object of the invention to provide apparatus including a cabinet containing a transistorized audio amplifier and radio tuner, with switch means adapted to support a telephone handset thereon for connecting the audio amplifier to a power supply in the cabinet when the handset is supported on the cabinet.

Another object is to provide an apparatus of the character described, wherein the switch means includes a portion effective to disconnect the signal output of the radio tuner from the audio amplifier when the handset is supported on the cabinet.

A further object is to provide an apparatus including a cabinet having a hinged door carrying a radio broadcast antenna and including switch means adapted to connect a radio tuner and an audio amplifier in the cabinet to a power supply when the door is opened, there being a radio tuning dial exposed on the cabinet when the door is opened.

A still further object is to provide apparatus of the character last described, wherein there is provided a pivotable support operating switches in the cabinet, the pivotable support being adapted to hold a telephone handset thereon, one of the switches connecting the audio amplifier to the power supply and another of the switches disconnecting the signal output of the radio tuner from the audio amplifier when the handset is on the pivotable support.

Another object is to provide apparatus of the character described, wherein the cabinet is formed with recesses at said pivotable support, there being microphones mounted in the recesses to pick up sounds from the receiver of the telephone handset in different positions of the handset on the support, the recesses being effective to collect sounds emitted by the receiver of the telephone handset and directing them to one of the microphones and for picking up the voice of a person speaking and directing it to the telephone transmitter so that the person need not hold the telephone handset during use, the microphones being connected to the audio amplifier.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
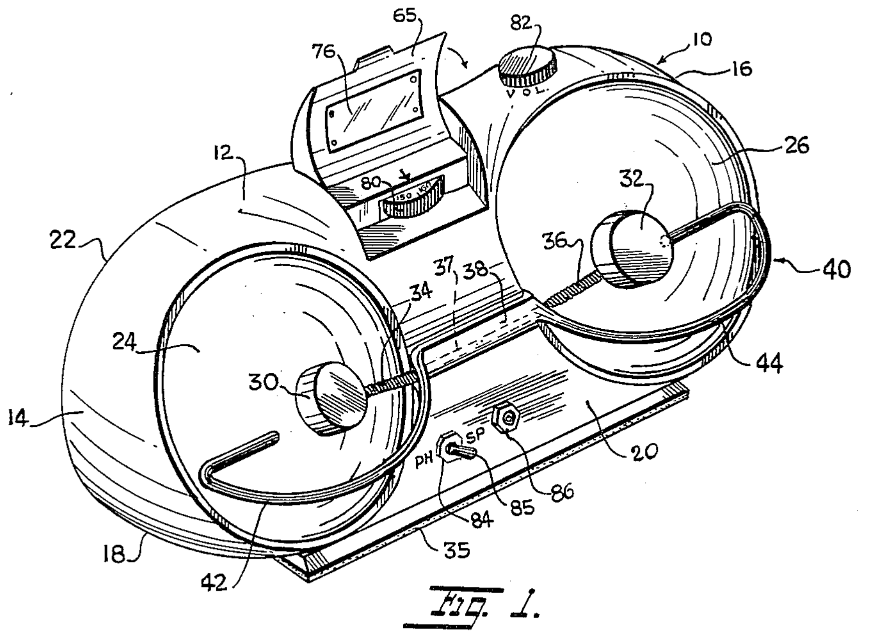
FIG. 1 is a perspective view of the apparatus embodying the invention, with cabinet door open.

In FIGS. 1–7, there is shown a cabinet 10 in the form of a hollow plastic casing with curved top 12, rounded ends 14, 16, a flat bottom 18, substantially flat front wall 20 and rear wall 22. At the front of the cabinet are formed two spaced spherically curved recesses or concavities 24, 26 near the respective ends of the cabinet. Near the geometrical center of each recess and substantially coplanar with the front wall are two microphones 30, 32 supported by springs 34, 36. The microphones face rearwardly toward the curved walls of the recesses to pick up sounds reflected from the walls of the recesses. Coil springs 34 and 36, through which pass electric wires 37 to microphones 30 and 32, are connected to and are supported near opposite ends of a central bar portion 38 of telephone handset support 40.

Figure 2:
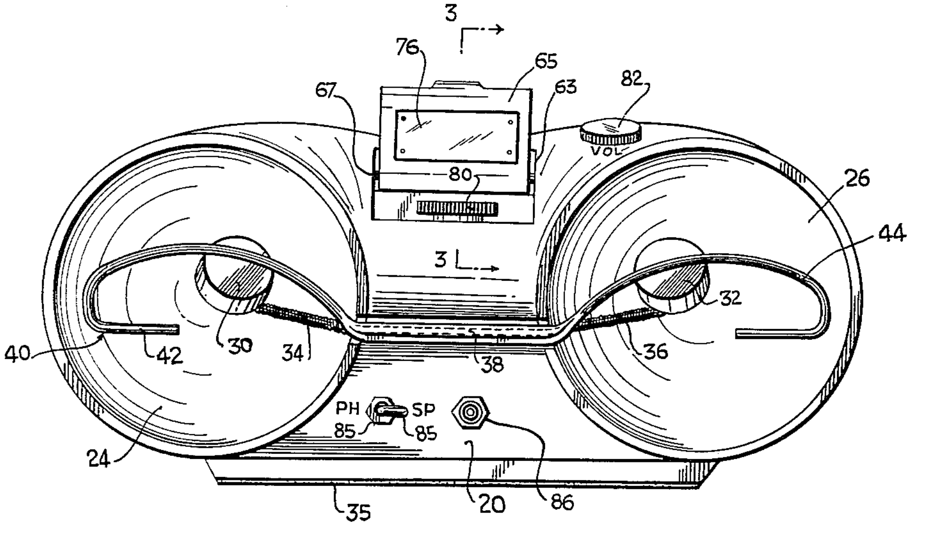
FIG. 2 is a front elevational view of the apparatus.
Figure 3:
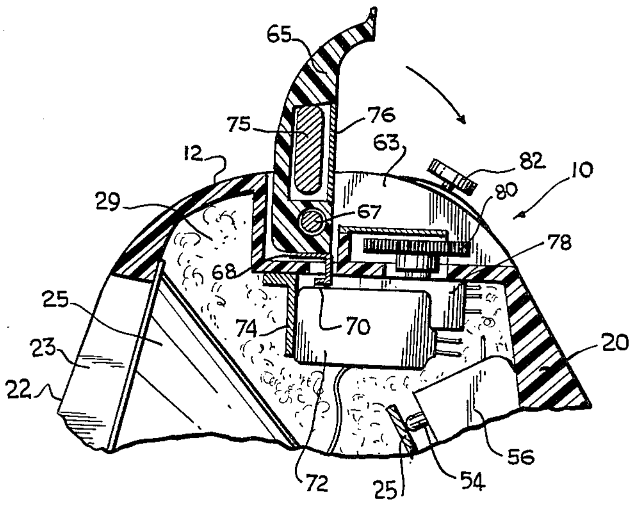
FIG. 3 is a fragmentary cross-sectional view taken on line 3—3 of FIG. 2.
Figure 4:
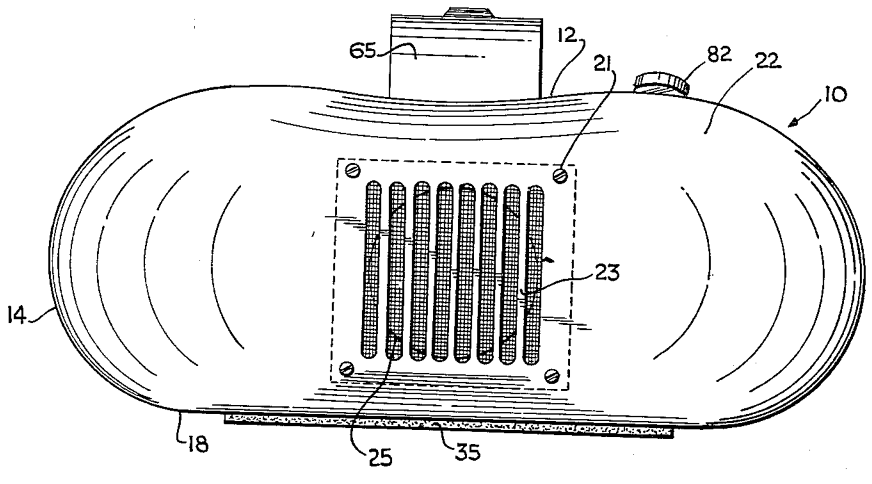
FIG. 4 is a rear view of the apparatus.

The handset support, as best shown in FIGS. 1–3, includes a pair of rigid loops 42, 44 integral with bar portion 38 and extending outwardly in a horizontal plane from the front of the cabinet.

Bar portion 38 is integral with an arm 46 pivotally mounted on a shaft 50 in the cabinet; see FIG. 3. A laterally extending finger 52 is formed at the inner end of arm 46. This finger contacts button 54 of a push button switch 56 supported on bracket 58 in the cabinet. Another laterally extending finger 53 at the end of arm 46 contacts button 55 of another switch 60 mounted on bracket 58. Spring 62 is disposed between finger 52 and the front cabinet wall and biases the arm 46 counterclockwise as viewed in FIG. 6. Thus, loops 42, 44 are in a raised position when handset H is absent from the support 40. The support 40 can be pivoted downwardly or clockwise as viewed in FIG. 6 against the bias in spring 62, when handset H is placed upon the loops. Wires 37 pass through a passage 57 formed in the arm 46 and bar 38 and terminate at transistorized audio amplifier 27 in the cabinet.

Figure 6:
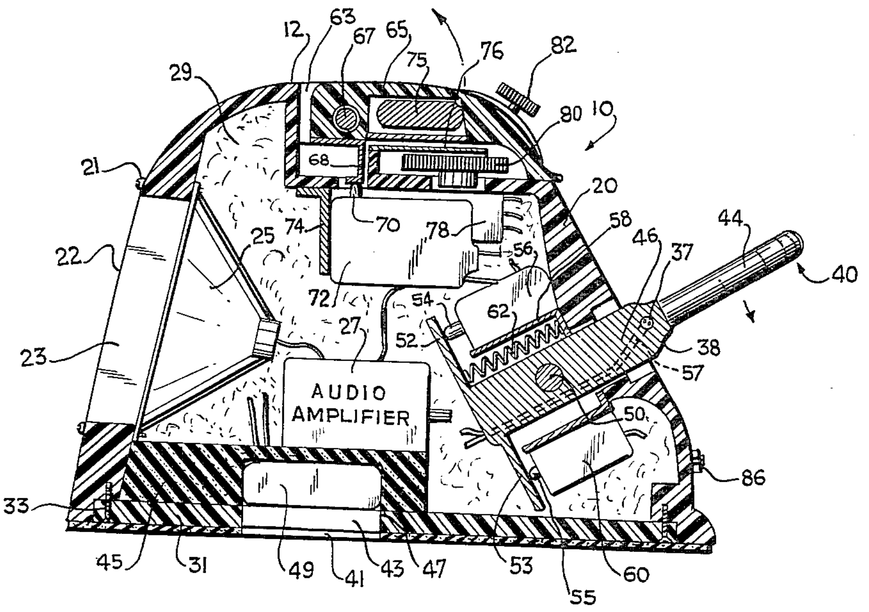
FIG. 6 is a sectional view taken on line 6—6 of FIG. 5 but with the handset removed.

At the top of the cabinet is an opening 63 in which is movably mounted a door or cover 65 hinged on a shaft 67 to open and close. The door carries a depending finger 68 which bears on a button 70 of a switch 72 mounted on a bracket 74. When the door is open the button 70 is depressed as shown in FIG. 3. When the door is closed the button is released as shown in FIG. 6 so that the switch is open. Button 54 of switch 56 is normally released and button 55 of switch 60 is normally depressed when the handset H is removed from support 40, so that switches 56 and 60 are respectively opened and closed. When the handset H is placed on support 40, switch 56 is closed and switch 60 is opened as button 54 is depressed and button 55 is released.

Figures 7, 8:
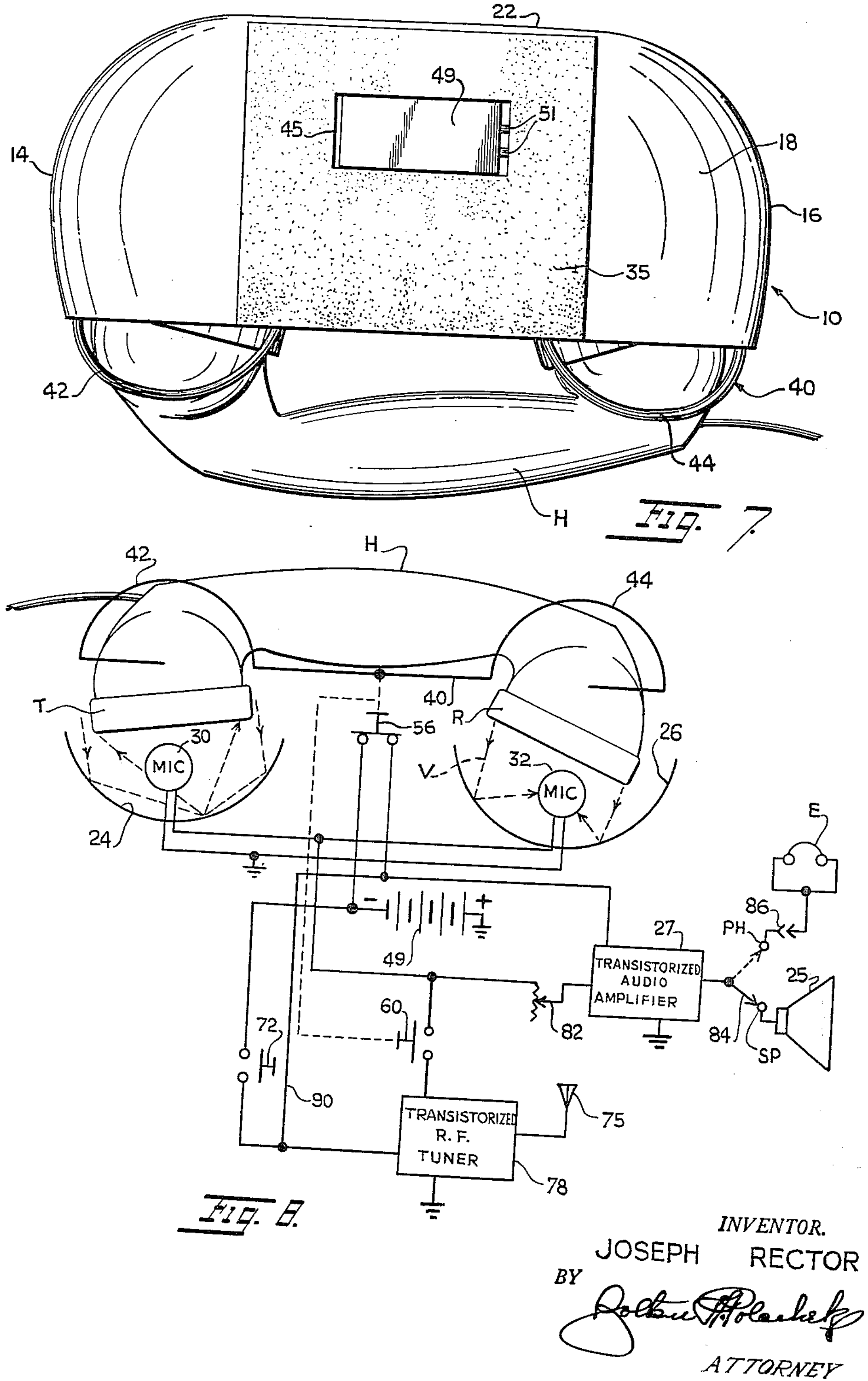
FIG. 7 is a bottom plan view of the apparatus assembly of FIG. 5.
FIG. 8 is an electrical diagram of basic components of the apparatus.

In the door 65 is mounted a bar antenna 75 covered by a plate 76. The antenna is connected electrically to a transistorized radio tuner 78 having a tuning dial 80 exposed in the opening 63. This dial is accessible when the door is opened to tune the radio tuner. A volume control 82 is mounted at the top of the cabinet for controlling amplification of amplifier 27. A speaker-earphone switch 84 having positions marked SP and PH is located at the front of the cabinet. A plug of an earphone can be inserted into jack or socket 86 also located at the front of the cabinet and handle 85 of switch 84 can be thrown to PH to connect the earphone E to the output of amplifier 27 as best shown in FIG. 8. When the switch is in SP position loud-speaker 25 is connected to the amplifier.

The rear wall 22 is formed with a plurality of slots 23. On the inner side of the slotted wall is mounted by screws 21 a loud-speaker 25 connected to a transistorized audio amplifier 27; see FIGS. 3, 6. A mass of fibrous material 29 in the cabinet serves to reduce reverberations of sound in the cabinet.

In the open bottom of the cabinet is a base plate 31 held by screws 33. To the exposed side of plate 31 is secured a sponge rubber pad 35. Registering rectangular openings 41, 43 are formed in the pad and plate. A sponge rubber or plastic block 45 having a cavity 47 is disposed on the plate 31. In this cavity removably fits a battery 49. The battery makes plug-in connection with circuit terminals 51; see FIG. 7.

FIG. 8 shows schematically the electrical diagram of the apparatus. Microphones 30 and 32 are connected to amplifier 27 via volume control 82. The battery 49 is connected to the amplifier to energize the same via normally open switch 56, shown closed because handset H is pressing down on support 40, to close switch 56. Switch 60, which connects the signal output of tuner 78 to the amplifier 27, is open because of the presence of the handset H on the support 40. Switch 84 is at SP so that loud-speaker 25 is connected to the output of amplifier 27. Switch 72, which is connected between battery 49 and the tuner 78, is open. Antenna 75 is connected to the tuner 78.

Figure 5:
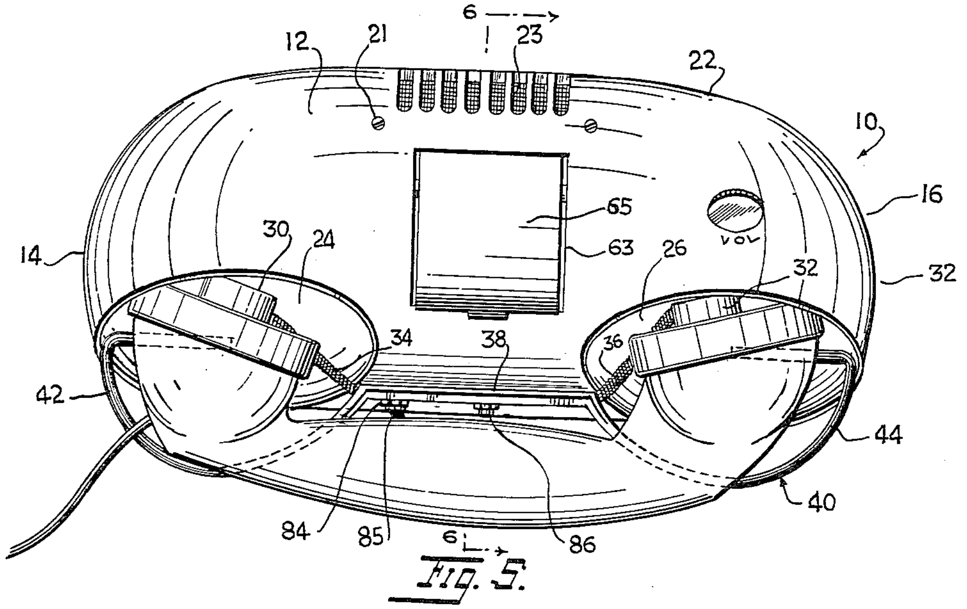
FIG. 5 is a top plan view of the apparatus with a telephone handset shown mounted thereon and with the cabinet door closed.

In operation, the handset H can be placed on support 40 with the transmitter T at either recess 24 or 26. In either position the user's voice will be collected at the recess where the transmitter T is located and will be directed to the transmitter. The receiver R will be located at the other recess and will reproduce sound signals which will be collected by the recess as indicated by dotted lines V in FIG. 8, and delivered to the adjacent microphone. The amplifier 27 is energized in the arrangement of FIG. 8 because switch 56 is closed. The door 65 of the cabinet is closed as shown in FIGS. 5 and 6 so that switch 72 is open. Tuner 78 is energized but the output circuit of the tuner is open at switch 60 so that no radio signals can be applied to the amplifier which only amplifies the telephone signals.

If the handset H is removed from support 40, switch 56 opens and switch 60 closes to connect the signal output of the tuner 78 to the amplifier. Since both switches 56 and 72 are open, the amplifier and tuner are deenergized. If door 65 is opened the switch 72 will close to energize the tuner and amplifier 27 will also become energized via wire 90. Radio signals can then be applied through switch 60 to the audio amplifier and the tuner can be tuned by dial 80.

The apparatus described is thus useful as both a radio and as a telephone amplifier. The user need not hold the telephone handset while transmitted and received voice signals are being collected in the concavities 24, 26. By opening door 65 the circuit changes from telephone to radio operation. By removing handset H radio signals are applied to the amplifier from tuner 78.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A telephone amplifier comprising a cabinet having a substantially flat front wall and a rear wall, said front wall having spherically curved sound-producing concavities spaced apart for alignment of the respective transmitter and receiver portions of a telephone handset therewith, a handset support pivotally connected to the cabinet for limited vertical swing movement in front thereof, said support having a central bar portion, rigid loops respectively extending outwardly from the bar portion in a lateral plane across the diameters of the concavities, said loops being adapted to receive and support respectively the transmitter and receiver portions of the handset in alignment with the concavities, a switch operating arm extending from the support bar portion rearwardly into the cabinet, a transistorized audio amplifier mounted in the cabinet in rear of the front wall thereof, a loudspeaker connected to the amplifier and lying in one of the walls of the cabinet, a switch mounted in the cabinet in circuit with the amplifier and closed by the operating arm of the pivoted handset support upon the support being tilted under the weight of the handset, biasing means tending to keep the handset support elevated and the switch unoperated when free of the handset and a microphone lying in at least one of the concavities and connected in circuit relation with the amplifier.

2. A telephone amplifier and radio comprising a cabinet having a substantially flat front wall and a rear wall, said front wall having spherically-curved, sound-producing concavities spaced apart for alignment of transmitter and receiver portions of a telephone handset therewith, a handset support pivotally connected to the cabinet for limited vertical swing movement in front thereof, said support having a central bar portion and rigid loops respectively extending outwardly from the bar portion in a lateral plane across the diameters of the concavities, said loops being adapted to receive and support respectively the transmitter and receiver portions of the handset in alignment with the concavities, a switch operating arm extending from the support bar portion rearwardly into the cabinet, a transistorized audio amplifier mounted in the cabinet in rear of the front wall thereof, a loudspeaker connected to the amplifier and lying in one of the walls of the cabinet, two switches mounted respectively above and below said rearwardly extending operating arm, said amplifier being in circuit with one of said switches which is closed by the arm upon the same being tilted under the weight of the handset upon the handset support, biasing means tending to keep the handset support elevated and the switch unoperated when free of the handset, a microphone lying in at least one of the concavities and connected to the amplifier, a radio set mounted in the cabinet and connected to the other of said switches and to said amplifier, said other switch being opened by said arm to disconnect the radio upon the handset weighting the handset support.

References Cited in the file of this patent

UNITED STATES PATENTS 2,528,636 Cisin ------------------- Nov. 7, 1950

FOREIGN PATENTS 1,013,279 France ----------------- July 25, 1952

1,215,299 France ----------------- Apr. 15, 1960